United States Patent [19]

Ikeno

[11] Patent Number: 5,599,894
[45] Date of Patent: Feb. 4, 1997

[54] SILICONE GEL COMPOSITIONS

[75] Inventor: Masayuki Ikeno, Gunma-ken, Japan

[73] Assignee: Shin-Etsu Chemical Co., Ltd., Tokyo, Japan

[21] Appl. No.: 465,457

[22] Filed: Jun. 5, 1995

[30] Foreign Application Priority Data

Jun. 7, 1994 [JP] Japan ................................. 6-148661

[51] Int. Cl.⁶ ................................................. C08G 77/08
[52] U.S. Cl. ............................. 528/15; 528/32; 525/478; 525/479; 428/447; 428/901
[58] Field of Search ..................... 528/15, 32; 525/478, 525/479; 428/901, 447

[56] References Cited

U.S. PATENT DOCUMENTS

| | | | |
|---|---|---|---|
| 4,340,710 | 7/1982 | Brown, Jr. | 525/478 |
| 4,558,112 | 12/1985 | Talcott | 528/32 |
| 4,698,386 | 10/1987 | Fujimoto | 525/478 |
| 4,720,431 | 1/1988 | Wong | 525/478 |
| 4,771,119 | 9/1988 | Wrobel | 528/15 |
| 5,086,147 | 2/1992 | Ikeno et al. | 528/32 |

*Primary Examiner*—Melvyn I. Marquis
*Attorney, Agent, or Firm*—Millen, White, Zelano, & Branigan, P.C.

[57] ABSTRACT

The invention involves a silicone gel composition comprising (A) 100 parts by weight of an organopolysiloxane of average compositional formula (1):

$$R^1_a R^2_b SiO_{(4-a-b)/2} \qquad (1)$$

wherein $R^1$ is an alkenyl group: $R^2$ is an optionally substituted, monovalent hydrocarbon group without an aliphatic unsaturated bond and the subscripts a and b are positive numbers $0<a<3$, $0<b<3$, and $1<a+b<3$, (B) 0.05 to 10 parts by weight of an organosiloxane oligomer having alkenyl groups bound to silicon atoms only at the terminal ends of the molecule and at least three such alkenyl groups per molecule, (C) an organohydrogen polysiloxane having at least two hydrogen atoms bound to silicon atoms per molecule, and (D) a catalytic amount of an addition reaction catalyst. The invention also involves electronic materials coated therewith.

16 Claims, No Drawings

SILICONE GEL COMPOSITIONS

BACKGROUND OF THE INVENTION

This invention relates to the silicone gel compositions which possess a high resistance to poisoning, especially to poisoning by solder flux and by amine compounds.

A gel cured product of a silicone rubber (which will be called a silicone gel in the specification below) possesses a superior stability both in electric insulation capacity and in electrical characteristics and flexibility; therefore, such materials are being utilized for the potting and sealing of electric and electronic parts, particularly as a coating material by covering control circuit elements such as power transistors, ICs, and condensers, in order to protect them from thermal and mechanical damage.

Conventionally, various types of addition curing organopolysiloxane compositions are known to form silicone gels. For example, one composition already known comprises an organopolysiloxane having vinyl groups bound to silicon atoms and an organohydrogen polysiloxane having hydrogen atoms bound to silicon atoms, which results in a silicone gel through the crosslinking reaction in the presence of a platinum type catalyst. (Japanese patent application Kokai (laid open) 56-143241, JP application Kokai 62-39659, JP application Kokai 63-35655, and U.S. Pat. No. 4,771,119 which corresponds to JP application Kokai 63-33475, EP 254,153 and CA 1,296,830.)

However, a silicone gel is a cured product with a low crosslinking density and it tends to be affected more readily by catalytic poison than silicone rubbers which have a high crosslinking density. Recent environmental problems have promoted a non-cleansing trend for the solder flux which is utilized in the soldering of electric and electronic parts. As a result, problematic inhibition of the silicone gel curing inhibition has been observed, the problem being due to the amine compounds within the solder flux. Further, contact with epoxy resins, which are utilized in large amounts as potting materials for the electric and electronic parts, also causes curing inhibition due to the amine curing agent which is employed for curing of the epoxy resins, leading to the unsuccessful curing of the gel. The conventional silicone gel compositions described above can not respond to such problems.

SUMMARY OF THE INVENTION

Therefore a purpose of the present invention is to offer silicone compositions which lead to silicone gel cured products without their curing properties being impaired by the amine compounds in solder flux and epoxy resins, while maintaining their desired characteristics as a protective and insulating material for ICs and wiring. The invention also involves the cured products thereof.

Upon further study of the specification and appended claims, further objects and advantages of this invention will become apparent to those skilled in the art.

In the present invention, the silicone gel possesses a cross-linked structure having a three-dimensional network structure and its hardness measured by JIS-K6301 is preferably at most 0. Therefore it is clearly distinguishable from the silicone rubber cured products (which usually possess a JIS-K6301 rubber hardness of at least 5) by not possessing an effective rubber hardness. The silicone gel cured product has a penetration measured by ASTMD-1403 (¼ cone) of preferably at most 200, more preferably from 10 to 200, still more preferably from 15 to 150.

The composition of the invention involves silicone gel compositions with organopolysiloxanes having alkenyl groups, organohydrogen polysiloxanes, and an addition reaction catalyst. Specifically, the composition contains (A) about 100 weight parts of an organopolysiloxane which is expressed by the following average compositional formula (1) below:

$$R^1_a R^2_b SiO_{(4-a-b)/2} \quad (1)$$

wherein:
R$^1$ is an alkenyl group;
R$^2$ is either a substituted or unsubstituted monovalent hydrocarbon group without an aliphatic unsaturated bond, and the subscripts a and b are positive numbers which satisfy the conditions 0<a<3, 0<b<3, and 1<a+b<3, said organopolysiloxane having 0.1 to 2 alkenyl groups bound to silicon atoms per molecule on the average, and preferably possessing a viscosity of about 100 to 100,000 cp at 25° C. as the organopolysiloxane having alkenyl groups, along with (B) about 0.05 to 10 weight parts of organosiloxane oligomers which possess alkenyl groups bound to silicon atoms only at the molecular terminus having at least three of such alkenyl groups per molecule. Such materials result in silicone gel compositions which prevent or lessen curing inhibition by the amine compounds to the extent possible, which has led to the present invention.

Therefore, a purpose of the present invention was achieved by the silicone gel compositions which contains (A) 100 weight parts of said organopolysiloxane, (B) 0.05 to 10 weight parts of said organosiloxane oligomers, (C) an organohydrogen polysiloxane having at least two hydrogen atoms bound to silicon atoms per molecule which is expressed by the following average compositional formula (2) below:

$$R^3_c H_d SiO_{(4-c-d)/2} \quad (2)$$

wherein:
R$^3$ is either a substituted or unsubstituted monovalent hydrocarbon group; and
the subscripts c and d are positive numbers which satisfy the conditions of 0<c<3, 0<d≦2, and 0.8<c+d≦3, at an amount such that the number of the said hydrogen atoms bound to silicon atoms preferably ranges from 0.4 to 1.5 per alkenyl group bound to silicon atoms in the said (A) and (B) components, and (D) a catalytic amount of an addition reaction catalyst.

Most preferably, the composition is a silicone gel comprising:

(A) 100 parts by weight of an organopolysiloxane of average compositional formula (1)

$$R^1_a R^2_b SiO_{(4-a-b)/2} \quad (1)$$

wherein:
R$^1$ is an alkenyl group;
R$^2$ is an optionally substituted, monovalent hydrocarbon group without an aliphatic unsaturated bond; and
the subscripts a and b are positive numbers 0<a<3, 0<b<3, and 1<a+b<3, said organopolysiloxane having an average of 0.1 to 2 alkenyl groups bound to silicon atoms per molecule, and a viscosity of 100 to 100,000 cp at 25° C.;

(B) 0.05 to 10 parts by weight of an organosiloxane oligomer having alkenyl groups bound to silicon atoms only at the terminal ends of the molecule and at least three such alkenyl groups per molecule;

(C) an organohydrogen polysiloxane having at least two hydrogen atoms bound to silicon atoms per molecule; and (D) a catalytic amount of an addition reaction catalyst.

Below the present invention is explained further in detail. In the silicone gel compositions of the present invention, the organopolysiloxane, the (A) component is expressed by the following average compositional formula (1) below:

$$R^1_a R^2_b SiO_{(4-a-b)/2} \quad (1)$$

wherein $R^1$ is an alkenyl group: $R^2$ is either a substituted or unsubstituted monovalent hydrocarbon group without an aliphatic unsaturated bond; and the subscripts a and b are positive numbers which satisfy the conditions of $0<a<3$, $0<b<3$, and $1<a+b<3$.

Preferable alkenyl groups include those with 2 to 8 carbon atoms. In concrete, examples are: a vinyl group, an allyl group, a propenyl group, a 1-butenyl group, and a 1-hexenyl group. Preferably one organopolysiloxane molecule is comprised of these alkenyl groups at a ratio of 0.1 to 2, more desirably 0.5 to 1.8 on the average. Less than 0.1 alkenyl groups may result in difficulty in the gel preparation since there exist too many organopolysiloxane molecules which are not contributing to the crosslinking reaction. On the other hand, more than two alkenyl groups may cause the gel cured product to be excessively hard which may not function as a gel. As a result, inconveniences such as thermal stress generation in the cured product may occur. Further, these alkenyl groups may be bound to either the silicon atoms in the middle of the molecular chain (i.e., the silicon atoms in the monoorganosiloxane unit or the diorganosiloxane unit) or the silicon atoms at the molecular terminals (i.e., the silicon atoms in the triorganosiloxyl unit).

$R^2$ is either a substituted or unsubstituted monovalent hydrocarbon group without an aliphatic unsaturated bond and it is desirably a group with 1 to 12 carbons, more preferably with 1 to 10 carbons. Substituted $R^2$ groups are preferably substituted 1–9 times, more preferably 1–4 times. Examples of the substituted or unsubstituted monovalent hydrocarbon groups are: alkyl groups such as a methyl group, an ethyl group, a propyl group, an isopropyl group, a butyl group, a hexyl group, an octyl group, a decyl group and a dodecyl group; cycloalkyl groups such as a cyclopentyl group, a cyclohexyl group, and a cyclobutyl group; aryl groups such as a phenyl group, a tolyl group, a xylyl group, and a naphthyl group; aralkyl groups such as a benzyl group, a phenyl ethyl group, and a phenyl propyl group; and said hydrocarbon groups of which a part, or all, of the hydrogen atoms are substituted by halogen atoms such as chlorine atoms, fluorine atoms and bromine atoms, or cyano groups, for example, halogenized hydrocarbon groups such as a chloromethyl group, a trifluoropropyl group, a chlorophenyl group, a bromophenyl ground, a dibromophenyl group, a tetrachlorophenyl group, a fluorophenyl group, and a difluorophenyl group; and cyanoalkyl groups such as an α-cyanoethyl group, a β-cyanopropyl group, and a γ-cyanopropyl group. Further, two $R^2$ groups may join to form a lower alkylene group with at most 6 carbon atoms, i.e., a silalkylene structure ($\equiv Si-(CH_2)_{1-6}-Si\equiv$). Examples of such lower alkylene groups are: an ethylene group, a trimethylene group, a methyl ethylene group, a tetramethylene group, and a hexamethylene group.

The subscripts a and b are as defined above. However, they are, desirably, $0.0005 \leq a \leq 1$, and $1.5 \leq b \leq 2.4$, and $1.5 < a+b < 2.5$, more desirably $0.001 \leq a \leq 0.5$, $1.8 \leq b \leq 2.1$ and $1.8 < a+b \leq 2.2$, respectively.

The said organopolysiloxane may be a linear or branched chain, or a resin type with a three-dimensional network structure, or it may be a mixture of these types. However, in general, it is desirable to be a linear chain type diorganopolysiloxane, of which the main chain section basically consists of repeated diorganosiloxane units with both molecular terminals having been capped with triorganosiloxyl groups.

Further, the viscosity of the said organopolysiloxane (A) at 25° C. is desirably from about 100 to 100,000 cp, more specifically from 300 to 5000 cp. Less than 100 cp tends to flow too easily and may cause unsatisfactory physical properties in the cured products. On the other hand, more than 100,000 cp may impair workability and defoaming.

In the present invention, the organosiloxane oligomers having alkenyl groups are added as the (B) component, to the said (A) component, the organopolysiloxanes having alkenyl groups. These organosiloxane oligomers, the (B) component, play an important role in order to increase the poisoning resistance of the compositions of the present invention towards the amine compounds.

It is desirable for the said organosiloxane oligomers to possess alkenyl groups bound to silicon atoms substantially only at the molecular terminals i.e., only on the silicon atoms of the monofunctional siloxyl unit (which means the triorganosiloxyl unit), which is expressed by the $\equiv SiO_{1/2}$ unit. When the alkenyl groups exist in substantial numbers at a position other than the molecular terminals, the stability in gel hardness becomes impaired. Further, the number of the alkenyl groups bound to silicon atoms is preferably at least three per molecule, e.g., 3 to 50, more preferably 3 to 10 per molecule. Meeting these criteria assures that the alkenyl groups always coordinate to the addition reaction catalyst, which reduces the effect of the poisoning component and achieves the goals of the present invention.

The alkenyl groups in the (B) component are suitably those with 2 to 8 carbon atoms, e.g., vinyl group, an allyl group, a propenyl group, a 1-butenyl group, and a 1-hexenyl group. Typically, the alkenyl groups preferably are in the form of $(CH_2=CH)(CH_3)_2SiO_{1/2}$ units in the (B) component. Other organic groups bound to silicon atoms are either a substituted or unsubstituted monovalent hydrocarbon group without aliphatic unsaturated bonds. As with $R^2$ in the (A) component, examples are those with 1 to 12 carbons, more desirably 1 to 10 carbons, however, a methyl group is most desirable from the view point of easy synthesis. The groups may be substituted as set forth for $R^2$.

The molecular weight of the (B) component, the organosiloxane oligomers, is desirably from 300 to 10,000, more preferably from 300 to 1,000. Further, the number of silicon atoms per molecule is desirably from 4 to 50, more preferably from 4 to 20. In addition, the viscosity of the (B) component, the organosiloxane oligomers, at 25° C., is usually at most 100 cp, usually in the range of 0.5 to 100 cp, desirably in the range from 1 to 50 cp.

Examples of the (B) component, the organosiloxane oligomers, are as below:

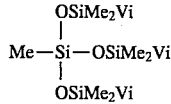

-continued

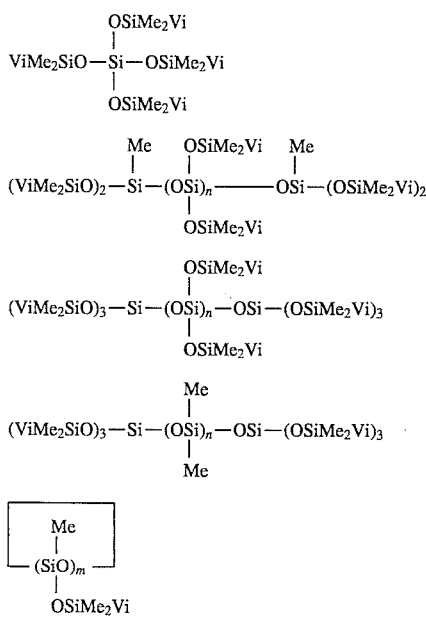

Wherein Me is a methyl group; Vi is a vinyl group; n is an integer from 0 to 50, desirably from 0 to 30, more preferably from 0 to 10; and m is an integer from 4 to 10, desirably from 4 to 7.

The amount of the (B) component used is from 0.05 to 10 weight parts, more desirably from 0.2 to 5 weight parts based on 100 weight parts of the (A) component. When the amount of the (B) component is less than 0.05 weight parts, the poisoning resistance against the amine compounds is not substantially improved, while more than 10 weight parts may impair the mechanical strength of the obtained gel.

The (C) component, the organohydrogen polysiloxane, possesses at least two, preferably three or more, hydrogen atoms bound to silicon atoms (SiH groups) per molecule, wherein the said hydrogen atoms and the alkenyl groups within the said organopolysiloxane (A) and the organosiloxane oligomers (B) undergo an addition reaction to form gel cured products, and which is expressed by the following average compositional formula (2) below:

wherein $R^3$ is either a substituted or unsubstituted monovalent hydrocarbon group; and the subscripts c and d are positive numbers which satisfy the conditions of $0 < c < 3$, $0 < d \leq 2$, and $0.8 < c+d \leq 3$, preferably $0.8 < c \leq 2.2$, $0.002 \leq d \leq 1$, and $1 \leq c+d \leq 2.5$.

Here the examples of $R^3$ are usually groups with 1 to 12, more specifically 1 to 10, carbon atoms without having aliphatic unsaturated bonds, as similarly to those of the said $R^2$. Substitution is as disclosed for $R^2$. However, they may be alkenyl groups with 2 to 8 carbon atoms, similarly to $R^1$.

The structure of the said organohydrogen polysiloxane is not limited to specifics and it may be a linear chained, branched, cyclic, or a resin type with a three-dimensional network structure. One type may be used alone or two or more types may be combined.

The viscosity of the (C) component, the organohydrogen polysiloxane at 25° C., is desirably at most 1,000 cp usually from 0.1 to 1,000 cp, more specifically from 0.5 to 500 cp, from the view point of synthetic ease.

The amount of the (C) component in the silicone gel compositions of the present invention is preferably such that the amount of the SiH groups in the (C) composition ranges desirably from 0.4 to 1.5 mol, more preferably from 0.7 to 1.2 mol per alkenyl group comprised in the said (A) and (B) components. This value is based on reducing foaming during the curing of the compositions, and providing superior thermal resistance and physical properties of the obtained gel-like cured products.

The addition reaction catalysts (D) of the present invention may be any catalysts promoting the addition reaction of the alkenyl groups in the components (A) and (B) with SiH groups in the component (C), for example, platinum group metal type catalysts. Examples of the platinum group metal type catalysts are chloroplatinic acid; alcohol denatured chloroplatinic acid; coordinated compounds of chloroplatinic acid with olefins, vinyl siloxanes, and acetylene compounds; tetrakis (triphenyl phosphine) palladium; and chlorotris (triphenyl phosphine) rhodium. Among these, the most desirable ones are the platinum type compounds.

The amount of the (D) component used is a catalytic amount, usually 0.1 to 500 ppm, preferably 1 to 100 ppm calculated as platinum atoms added to the total amount of the (A) through (C) components.

In the silicone gel compositions of the present invention, various types of known additives may be added in addition to the said components (A) through (D).

For example, inorganic fillers such as fumed silica, silica aerosol, precipitated silica, crushed silica, diatomaceous earth, iron oxide, zinc oxide, titanium oxide, calcium carbonate, magnesium carbonate, zinc carbonate, and carbon black, may be added to control the hardness and mechanical strength of the gel-like cured products obtained from the silicone gel compositions of the present invention. Further, hollow inorganic fillers, hollow organic fillers, organosilicone resins, and rubber type ball fillers may also be added. In addition, the reaction controlling agents such as acetylene compounds and organic phosphorous compounds may be added to control the curing reaction. Further, organohydrogen polysiloxanes having one SiH group per molecule may be added to control the hardness of the cured products. The amounts of these additives are arbitrary as far as the characteristics of the gel-like cured product is not impaired.

The silicone gel compositions of the present invention provide silicone gel through curing. The curing conditions are not limited to specifics, however, it is usually desirable to employ a temperature from 60° to 150° C. for 30 to 180 minutes. In this case, the compositions of the present invention prevent the amine compounds from inhibiting the curing process as much as possible by the addition of the said (B) component. Therefore these are suitably employed as a potting agent and a sealing material.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding Japanese application 6-148,661 are hereby incorporated by reference.

EXAMPLES

Example 1

100 parts of dimethyl polysiloxane having 0.64 vinyl groups on average per molecule which essentially comprises 99 mol % of Me$_2$SiO unit, 0.32 mol % of ViMe$_2$SiO$_{0.5}$ unit, and 0.68 mol % of Me$_3$SiO$_{0.5}$ unit with a viscosity of 800 cp at 25° C., 0.3 parts of silicone oligomer expressed by the formula below, 1.22 parts of methyl hydrogen polysiloxane which comprises 62 mol % of Me$_2$SiO unit, 37 mol % of MeHSiO unit, and 1 mol % of Me$_3$SiO$_{0.5}$ unit with 100 cp viscosity at 25° C., and 0.1 part of ethynyl cyclohexanol are mixed uniformly. Then, a catalyst which is a complex of platinum with 1, 3-divinyl tetramethyl disiloxane is dissolved into dimethyl polysiloxane, of which both terminals are sealed with vinyl groups and with a viscosity of 600 cp (25° C.), to adjust a platinum concentration to 1 weight %. The 0.05 parts of the prepared catalytic solution is added and mixed uniformly to prepare the Composition-1.

Example 2

Composition-2 is prepared by a similar method as described in Example 1, except that the oligomer, of the formula shown below, is employed in place of the silicone oligomer used in Example 1.

Example 3

Composition-3 is prepared by a similar method as described in Example 1, except that the oligomer, of the formula shown below, is employed in place of the silicone oligomer used in Example 1.

Example 4

Composition-4 is prepared by a similar method as described in Example 1, except that the oligomer of the formula shown below is employed in place of the silicone oligomer used in Example 1.

Comparison Example 1

Composition-5 is prepared by a similar method as described in Example 1 except that the oligomer of the formula shown below, is employed in place of the silicone oligomer used in Example 1.

Comparison Example 2

Composition-6 is prepared by a similar method as described in Example 1 except that the silicone oligomer used in Example 1 is not used and 0.7 part of methyl hydrogen polysiloxane (the same compound used in Example 1) is employed.

Silicone Oligomers

Example 1:

OSiMe$_2$Vi
|
ViMe$_2$SiO—Si—OSiMe$_2$Vi
|
OSiMe$_2$Vi

Example 2:

OSiMe$_2$Vi
|
(ViMe$_2$SiO)$_3$Si—(OSi)$_2$—OSi—(OSiMe$_2$Vi)$_3$
|
OSiMe$_2$Vi

Example 3:

Me
|
ViMe$_2$SiO—Si—OSiMe$_2$Vi
|
OSiMe$_2$Vi

Silicone Oligomers

Example 4:

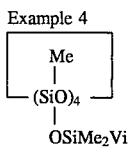
|
OSiMe$_2$Vi

Comparison Example 1:

Me
|
Me$_3$OSi—(SiO)$_3$—SiMe$_3$
|
Vi

Then, Compositions 1 through 6 obtained above are heated at 150° C. for 30 minutes, which provides cured transparent gel-like products. The hardness at the JIS-K6301 is 0 for all of these cured products. Further, the penetration degree of the gel products is measured by using a ¼ scale penetration meter (ASTM D-1403) and the obtained values are shown in Table 1 as an initial value.

Then, 100 ppm of γ-aminopropyl triethoxy silane (which is an aminosilane compound) in a 10 wt % toluene solution is added to the said Compositions 1 through 6 as an amine compound, and is mixed uniformly. The obtained mixture is heated at 150° C. for 30 minutes, the penetration degrees shown in Table 1 are obtained.

TABLE I

| | Penetration | |
|---|---|---|
| | Initial Values | Aminosilane added |
| Ex. 1 | 86 | 91 (6%) |
| Ex. 2 | 83 | 87 (5%) |
| Ex. 3 | 84 | 91 (8%) |
| Ex. 4 | 84 | 93 (11%) |
| C. Ex. 1 | 88 | 115 (30%) |
| C. Ex. 2 | 90 | 135 (50%) |

( ): Changed ratio of the penetration degree

Based on the results above, it is apparent that the examples of the present invention Compositions 1 through 4, possess improved poisoning resistance towards amine compounds, compared to Compositions 5 and 6 of the Comparison Examples.

The preceding examples can be repeated with similar success by substuting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A silicone composition comprising (A) 100 parts by weight of an organopolysiloxane having an average of 0.5 to 2 alkenyl groups per molecule, and an average compositional formula (1):

$$R^1_a R^2_b SiO_{(4-a-b)/2} \qquad (1)$$

wherein R$^1$ is an alkenyl group: R$^2$ is an optionally substituted, monovalent hydrocarbon group without an aliphatic unsaturated bond, and the subscripts a and b are positive numbers 0.005≦a≦1, 1.5≦b≦2.4 and 1.5<a+b<2.5, (B) 0.05 to 10 parts by weight of an organosiloxane oligomer having at least 3 alkenyl groups bound to silicon atoms at the terminal ends of the molecule in the form of $(H_2C=CH)(CH_3)_2SiO_{1/2}$ units, (C) an organohydrogen polysiloxane having at least two hydrogen atoms bound to silicon atoms per molecule, and (D) a catalytic amount of an addition reaction catalyst.

2. A composition according to claim 1, wherein the organopolysiloxane (1) has an average of 0.5 to 1.8 alkenyl groups bound to silicon atoms per molecule and a viscosity of 100 to 100,000 cp at 25° C.

3. A composition according to claim 1, wherein the organopolysiloxane (c) has the average compositional formula (2):

$$R^3{}_c H_d SiO_{(4-c-d)/2} \qquad (2)$$

wherein $R^3$ is an optionally substituted monovalent hydrocarbon group; and the subscripts c and d are positive numbers $0<c<3$, $0<d\leq 2$, and $0.8<c+d\leq 3$, at an amount such that the number of the said hydrogen atoms bound to silicon atoms is 0.4 to 1.5 per alkenyl group bound to silicon atoms in components (A) and (B).

4. A composition according to claim 3, wherein $R^1$ is $C_{2-8}$-alkenyl, $R^2$ is alkyl, cycloalkyl, aryl or aralkyl, each of up to 12 carbon atoms, optionally substituted by halogen or cyano, or two $R^2$ groups may join to form a lower alkylene group of up to 6 carbon atoms, and $R^3$ is alkyl, cycloalkyl, aryl or aralkyl, each of up to 12 carbon atoms, or $C_{2-8}$-alkenyl, each optionally substituted by halogen or cyano.

5. A composition according to claim 4, wherein the alkenyl groups are vinyl, allyl, propenyl, 1-butyl or 1-hexenyl.

6. A composition according to claim 1, wherein (B) contains at least one non-alkenyl group bonded thereto, which group is alkyl, cycloalkyl, aryl or aralkyl, each of up to 12 carbon atoms, optionally substituted by halogen or cyano.

7. A composition according to claim 1, wherein (B) is

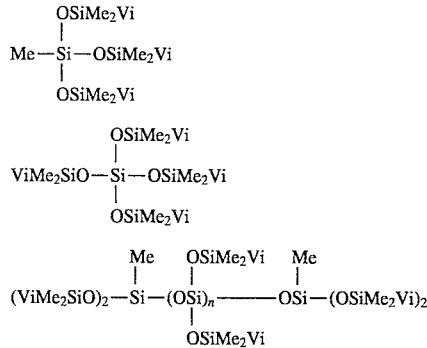

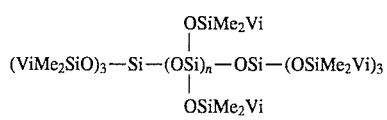

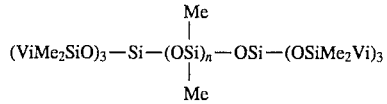

or

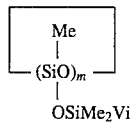

wherein Me is a methyl group, Vi is a vinyl group, n is an integer of 0–50, and m is an integer of 4–10.

8. A composition according to claim 1, wherein $R^1$ is vinyl, alkyl, propenyl, 1-butenyl or 1-hexenyl.

9. A composition according to claim 1, wherein $R^2$ is methyl, ethyl, propyl, isopropyl, butyl, hexyl, octyl, decyl, dodecyl, cyclopentyl, cyclohexyl, cyclobutyl, phenyl, tolyl, xylyl, naphthyl, benzyl, phenylethyl, phenylpropyl, chloromethyl, trifluoropropyl, chlorophoryl, bromophenyl, dibromophenyl, tetrachlorophenyl, fluorophenyl, difluorophenyl, α-cyanoethyl, β-cyanopropyl or γ-cyanoprpyl.

10. A compound according to claim 1, wherein $0<a\leq 1$ and $1.8\leq b\leq 2.2$.

11. A compound according to claim 1, wherein (A) consists of diorganosiloxane units with both molecular terminals capped with triorganosiloxyl groups.

12. A compound according to claim 1, wherein the catalyst is a platinum group catalyst.

13. A compound according to claim 12, wherein the catalyst is chloroplatinic acid; a coordinated compound of chloroplatinic acid with an olefin, a vinyl siloxane or an acetylene compound; tetrakis (triphenyl phosphine) palladium or chlorotris (triphenyl phosphine) rhodium.

14. A cured silicone material, comprising a composition according to claim 1.

15. An electric or electronic component, having a sealing or coating material thereon, wherein the material is a gel according to claim 14.

16. A circuit element, power transistor, integrated circuit or condenser, having a sealing or coating material thereon, wherein the material is a gel according to claim 14.

* * * * *